US012668282B2

(12) United States Patent
Jiang et al.

(10) Patent No.: US 12,668,282 B2
(45) Date of Patent: Jun. 30, 2026

(54) TRAJECTORY PREDICTION USING DIFFUSION MODELS

(71) Applicant: Waymo LLC, Mountain View, CA (US)

(72) Inventors: Chiyu Jiang, Sunnyvale, CA (US); Andre Liang Cornman, San Francisco, CA (US); Cheolho Park, Palo Alto, CA (US); Benjamin Sapp, Marina del Rey, CA (US); Yin Zhou, San Jose, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 198 days.

(21) Appl. No.: 18/511,710

(22) Filed: Nov. 16, 2023

(65) Prior Publication Data

US 2024/0157979 A1     May 16, 2024

Related U.S. Application Data

(60) Provisional application No. 63/426,004, filed on Nov. 16, 2022.

(51) Int. Cl.
| | |
|---|---|
| *B60W 50/06* | (2006.01) |
| *B60W 50/00* | (2006.01) |
| *B60W 60/00* | (2020.01) |

(52) U.S. Cl.
CPC ................. *B60W 60/00276* (2020.02); *B60W 50/0097* (2013.01); *B60W 50/06* (2013.01);
(Continued)

(58) Field of Classification Search
CPC ....... B60W 60/00276; B60W 50/0097; B60W 50/06; B60W 2556/10; B60W 2552/20; B60W 2554/4044
(Continued)

(56) References Cited

U.S. PATENT DOCUMENTS

| | | | |
|---|---|---|---|
| 12,001,958 B2 * | 6/2024 | Kamenev ............... | G06N 3/088 |
| 2020/0110416 A1 * | 4/2020 | Hong .................... | G06N 20/00 |

(Continued)

FOREIGN PATENT DOCUMENTS

| | | | |
|---|---|---|---|
| WO | WO-2023007849 A1 * | 2/2023 | ............. G08G 1/164 |

OTHER PUBLICATIONS

Xiaoyang Wang, Traffic Flow Prediction via Spatial Temporal Graph Neural Network, Apr. 20, 2020, Association for Computing Machinery (Year: 2020).*
(Continued)

*Primary Examiner* — Matthias S Weisfeld
(74) *Attorney, Agent, or Firm* — Fish & Richardson P.C.

(57) ABSTRACT

Methods, systems, and apparatus, including computer programs encoded on computer storage media, for generating trajectory predictions for one or more target agents, e.g., a vehicle, a cyclist, or a pedestrian, in an environment. In one aspect, one of the methods include: obtaining scene context data characterizing a scene at a current time point in an environment that includes multiple target agents; generating, from the scene context data, an encoded representation of the scene in the environment; and generating, by a diffusion model based on the encoded representation, a respective trajectory prediction output that predicts a respective future trajectory for each of the multiple target agents after the current time point.

21 Claims, 4 Drawing Sheets

(52) U.S. Cl.
CPC .................. *B60W 2552/20* (2020.02); *B60W 2554/4044* (2020.02); *B60W 2556/10* (2020.02)

(58) Field of Classification Search
USPC ......................................................... 701/27
See application file for complete search history.

(56) References Cited

U.S. PATENT DOCUMENTS

| | | | | |
|---|---|---|---|---|
| 2020/0265709 A1* | 8/2020 | Bush | .................. | G08G 1/09626 |
| 2021/0350231 A1* | 11/2021 | Look | .................... | G06N 3/0499 |
| 2023/0110713 A1* | 4/2023 | Degirmenci | ......... | G06N 3/0442 |
| | | | | 701/24 |
| 2025/0145179 A1* | 5/2025 | Knittel | .............. | B60W 30/0956 |

OTHER PUBLICATIONS

Baram et al., "End-to-End differentiable adversarial imitation learning," International Conference on Machine Learning, 2017, 70:390-399.

Barsoum et al., "HP-GAN: Probabilistic 3D human motion prediction via gan," Proceedings of the IEEE Conference on Computer Vision and Pattern Recognition (CVPR) Workshops, 2018, pp. 1418-1427.

Casas et al., "MP3: A unified model to map, perceive, predict and plan," Proceedings of the IEEE/CVF Conference on Computer Vision and Pattern Recognition, 2021, pp. 14403-14412.

Choi et al., "ILVR: Conditioning method for denoising diffusion probabilistic models," CoRR, Aug. 6, 2021, arXiv:2108.02938, 14 pages.

Chung et al., "Come-closer-diffuse-faster: Accelerating conditional diffusion models for inverse problems through stochastic contraction," Proceedings of the IEEE/CVF Conference on Computer Vision and Pattern Recognition (CVPR), 2022, pp. 12413-12422.

Chung et al., "Improving diffusion models for inverse problems using manifold constraints," CoRR, Jun. 2, 2022, arXiv:2206.00941, 29 pages.

Ettinger et al., "Large scale interactive motion forecasting for autonomous driving: The waymo open motion dataset," CoRR, Apr. 20, 2021, arXiv:2104.10133, 15 pages.

Fadel et al., "Contextual movement models based on normalizing flows," AStA Advances in Statistical Analysis, Aug. 13, 2021, pp. 51-72.

Gilles et al., "GOHOME: Graph-oriented heatmap output for future motion estimation," 2022 International Conference on Robotics and Automation (ICRA), May 23-27, 2022, pp. 9107-9114.

Gilles et al., "Home: Heatmap output for future motion estimation," 2021 IEEE International Intelligent Transportation Systems Conference (ITSC), Sep. 19-22, 2021, pp. 500-507.

Gomez-Gonzalez et al., "Real time trajectory prediction using deep conditional generative models," IEEE Robotics and Automation Letters, Apr. 2020, 5(2):970-976.

Gu et al., "DenseTNT: Waymo open dataset motion prediction challenge 1st place solution," CoRR, Jun. 27, 2021, arxiv.org/abs/2106.14160, 5 pages.

Gu et al., "Stochastic trajectory prediction via motion indeterminacy diffusion," Proceedings of the IEEE/CVF Conference on Computer Vision and Pattern Recognition (CVPR), 2022, pp. 17113-17122.

Ho et al., "Classifier-free diffusion guidance," CoRR, Jul. 26, 2022, arXiv:2207.12598, 14 pages.

Ho et al., "Denoising diffusion probabilistic models," Advances in Neural Information Processing Systems, 2020, 33:6840-6851.

Ho et al., "Generative adversarial imitation learning," Advances in Neural Information Processing Systems 29 (NIPS 2016), 2016, 9 pages.

Ho et al., "Imagen video: High definition video generation with diffusion models," Google Research, Brain Team, 2022, 18 pages.

Ho et al., "Video diffusion models," CoRR, Apr. 7, 2022, arXiv:2204.03458, 15 pages.

Hyvarinen et al., "Estimation of nonnormalized statistical models by score matching," Journal of Machine Learning Research, Apr. 2005, 6(4):695-709.

Igl et al., "Symphony: Learning realistic and diverse agents for autonomous driving simulation," CoRR, May 6, 2022, arXiv:2205.03195, 7 pages.

Ivanovic et al., "Multimodal deep generative models for trajectory prediction: A conditional variational autoencoder approach," IEEE Robotics and Automation Letters, Apr. 2021, 6(2):295-302.

Janner et al., "Planning with diffusion for flexible behavior synthesis," Proceedings of the 39th International Conference on Machine Learning, 2022, 162:9902-9915.

Kadkhodaie et al., "Stochastic solutions for linear inverse problems using the prior implicit in a denoiser," Advances in Neural Information Processing Systems, 2021, 34:13242-13254.

Karras et al., "Elucidating the design space of diffusion-based generative models," CoRR, Jun. 1, 2022, arXiv:2206.00364, 47 pages.

Kawar et al., "Denoising diffusion restoration models," CoRR, Jan. 27, 2022, arXiv:2201.11793, 32 pages.

Khandelwal et al., "What-if motion prediction for autonomous driving," CoRR, Aug. 24, 2020, arXiv:2008.10587, 16 pages.

Li et al., "Rain: Reinforced hybrid attention inference network for motion forecasting," Proceedings of the IEEE/CVF International Conference on Computer Vision, 2021, pp. 16096-16106.

Luo et al., "JFP: Joint Future Prediction with Interactive Multi-Agent Modeling for Autonomous Driving," 6th Conference on Robot Learning (CoRL 2022), Dec. 16, 2022, 13 pages.

Ma et al., "Diverse sampling for normalizing flow based trajectory forecasting," CoRR, Nov. 30, 2020, arXiv:2011.15084, 20 pages.

Mao et al., "Generating smooth pose sequences for diverse human motion prediction," Proceedings of the IEEE/CVF International Conference on Computer Vision, 2021, pp. 13309-13318.

Mercat et al., "Multi-Head Attention for Multi-Modal Joint Vehicle Motion Forecasting," CoRR, Oct. 9, 2019, arXiv: 1910.03650, 7 pages.

Mo et al., "Heterogeneous Edge-Enhanced Graph Attention Network For Multi-Agent Trajectory Prediction," CoRR, Jun. 14, 2021, arxiv.org/abs/2106.07161, 12 pages.

Nayakanti et al., "Wayformer: Motion Forecasting via Simple & Efficient Attention Networks," CoRR, Jul. 12, 2022, arXiv:2207.05844, 20 pages.

Ngiam et al., "Scene transformer: A unified multi-task model for behavior prediction and planning, " CoRR, Jun. 15, 2021, arxiv.org/abs/2106.08417, 25 pages.

Nichol et al., "Improved denoising diffusion probabilistic models," Proceedings of the 38th International Conference on Machine Learning, 2021, 139:8162-8171.

Oh et al., "CVAE-H: Conditionalizing variational autoencoders via hypernetworks and trajectory forecasting for autonomous driving," CoRR, Jan. 24, 2022, arXiv:2201.09874, 14 pages.

Poole et al., "Dreamfusion: Text-to-3D using 2D diffusion," CoRR, Sep. 29, 2022, arXiv:2209.14988, 18 pages.

Ramesh et al., "Hierarchical text-conditional image generation with clip latents," CoRR, Apr. 13, 2022, arXiv:2204.06125, 27 pages.

Rombach et al., "High-resolution image synthesis with latent diffusion models," Proceedings of the IEEE/CVF Conference on Computer Vision and Pattern Recognition (CVPR), 2022, pp. 10684-10695.

Saadatnejad et al., "A generic diffusion-based approach for 3D human pose prediction in the wild," CoRR, Oct. 11, 2022, arXiv:2210.05669, 10 pages.

Saharia et al., "Photorealistic text-to-image diffusion models with deep language understanding," CoRR, May 23, 2022, arXiv:2205.11487, 46 pages.

Sapp et al., "Multipath: Multiple probabilistic anchor trajectory hypotheses for behavior prediction," Proceedings of the Conference on Robot Learning, 2020, 100:86-99.

Scholler et al., "Flomo: Tractable motion prediction with normalizing flows," 2021 IEEE/RSJ International Conference on Intelligent Robots and Systems (IROS), Sep. 27, 2021, pp. 7977-7984.

Song et al., "Denoising diffusion implicit models," CoRR, Oct. 6, 2020, arXiv:2010.02502, 22 pages.

(56)         References Cited

OTHER PUBLICATIONS

Song et al., "PIP: Planning informed trajectory prediction for autonomous driving," CoRR, Mar. 35, 2020, arxiv.org/abs/2003.11476, 16 pages.

Song et al., "Score-based generative modeling through stochastic differential equations," CoRR, Nov. 26, 2020, arXiv:2011.13456, 36 pages.

Sun et al., "M2I: From factored marginal trajectory prediction to interactive prediction," CoRR, Feb. 24, 2022, arXiv:2202.11884, 15 pages.

Tang et al., "Multiple futures prediction," Advances in Neural Information Processing Systems 32 (NeurIPS 2019), 2019, 11 pages.

Tolstaya et al., "Identifying driver interactions via conditional behavior prediction," 2021 IEEE International Conference on Robotics and Automation (ICRA) May 30-Jun. 5, 2021, pp. 3473-3479.

Varadarajan et al., "Multipath++: Efficient information fusion and trajectory aggregation for behavior prediction," CoRR, Nov. 29, 2021, arXiv:2111.14973, 22 pages.

Yang et al., "Diffusion probabilistic modeling for video generation," CoRR, Mar. 16, 2022, arXiv:2203.09481, 21 pages.

Yuan et al., "AgentFormer: Agent-Aware Transformers for Socio-Temporal Multi-Agent Forecasting," CoRR, Mar. 25, 2021, arXiv:2103.14023, 14 pages.

Zeng et al., "DSDNet: Deep structured selfdriving network," Computer Vision—ECCV 2020, Nov. 12, 2020, pp. 156-172.

Zeng et al., "End-to-end interpretable neural motion planner," Proceedings of the IEEE/CVF Conference on Computer Vision and Pattern Recognition (CVPR), 2019, pp. 8660-8669.

Zhang et al., "MotionDiffuse: Text-driven human motion generation with diffusion modelm," CoRR, Aug. 31, 2022, arXiv:2208.15001, 16 pages.

Zhong et al., "Guided conditional diffusion for controllable traffic simulation," CoRR, Oct. 31, 2022, arXiv:2210.17366, 7 pages.

* cited by examiner

TRAJECTORY PREDICTION USING DIFFUSION MODELS

CROSS-REFERENCE TO RELATED APPLICATION

This application claims priority to U.S. Provisional Application Ser. No. 63/426,004, filed on Nov. 16, 2022. The disclosure of the prior application is considered part of and is incorporated by reference in the disclosure of this application.

BACKGROUND

This specification relates to predicting the future trajectory of an agent in an environment.

The environment may be a real-world environment, and the agent may be, e.g., a vehicle in the environment. Predicting the future trajectories of agents is a task required for motion planning, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car.

BRIEF DESCRIPTION OF THE DRAWINGS

Like reference numbers and designations in the various drawings indicate like elements.

DETAILED DESCRIPTION

Figure 1:
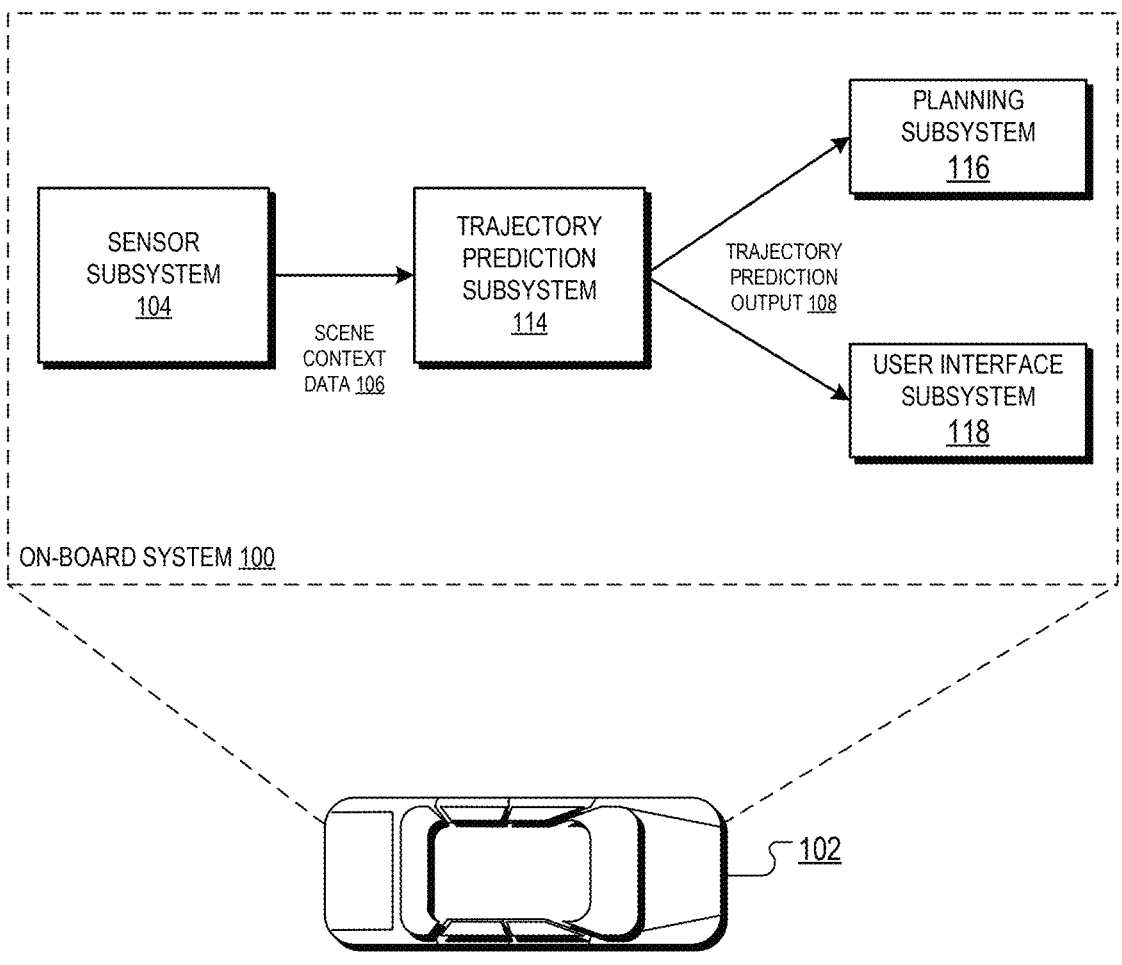
FIG. 1 is a block diagram of an example on-board system.

This specification describes a system implemented as computer programs on one or more computers in one or more locations that generates trajectory predictions for one or more target agents, e.g., a vehicle, a cyclist, or a pedestrian, in an environment. Each trajectory prediction is a prediction that defines the future trajectory of the corresponding target agent starting from a current time point.

For example, the trajectory predictions may be made by an on-board computer system of an autonomous vehicle navigating through the environment and the target agents may be agents that have been detected by the sensors of the autonomous vehicle. The behavior predictions can then be used by the on-board system to control the autonomous vehicle, i.e., to plan the future motion of the vehicle based in part on the likely future motion of other agents in the environment.

As another example, the trajectory predictions may be made in a computer simulation of a real-world environment being navigated through by a simulated autonomous vehicle and the target agents. Generating these predictions in simulation may assist in controlling the simulated vehicle, in testing the realism of certain situations encountered in the simulation, and in ensuring that the simulation includes surprising interactions that are likely to be encountered in the real-world.

More generally, generating these predictions in simulation can be part of testing the control software of a real-world autonomous vehicle before the software is deployed on-board the autonomous vehicle, of training one or more machine learning models that will later be deployed on-board the autonomous vehicle, or both.

Many existing trajectory prediction systems use either a supervised learning approach or a generative learning approach for trajectory prediction. In the supervised learning approach, a trajectory prediction model is trained to generate trajectory prediction outputs by using training data generated from logged trajectories to optimize a supervised loss, e.g., a L1 loss, a L2 loss, or another regression loss. In the generative learning approach, the system models the problem of generating future trajectories of agents given context as a conditional probability inference and uses a generative model to generate the predictions.

Several challenges arise in these existing trajectory prediction systems. First, trajectory prediction is probabilistic and multi-modal in nature (where the possible trajectories for a given agent have multiple "modes" that can each be plausibly followed by the given agent in the future), rendering it difficult to accurately predict an unbiased distribution of possible future trajectories.

Second, motion prediction requires jointly reasoning about the future trajectory distribution for a set of agents that may interact with each other in each future time step. Predicting and sampling from the marginal distribution of the future trajectories of each agent independently from other agents often leads to unrealistic and often conflicting outputs.

Third, while it is challenging to constrain or bias the predictions of conventional regression-based trajectory models, a guided sampling process from the distribution of the trajectories may nevertheless be required for trajectory generation after training. For example, it may be useful to enforce rules or physical priors for these predicted trajectories, e.g., when making predictions on-board an autonomous vehicle (e.g., conditioned on a planned trajectory of the autonomous vehicle) or when creating tailored simulation scenarios off-board the autonomous vehicle. This requires the ability to enforce constraints over the future time steps, or enforce a specified behavior for one or more agents among a set of agents.

All of these factors mean that existing ways of using supervised learning or generative learning approaches for trajectory prediction might result in a computationally expensive process that falls short of the strict efficiency requirements, safety requirements, or both of some applications which require a computer system to accurately predict future trajectories of an arbitrary number of other agents that may be present in the environment with minimal error (e.g., measured in terms of a difference between the predict future trajectories of another agent and the actual future trajectory of the other agent). For example, these might be requirements when making predictions for agents in the vicinity of autonomous vehicles navigating through real-world environments or simulated vehicles navigating through simulated environments, e.g., for use in generating planning decisions which cause the autonomous vehicle to travel along a safe trajectory.

To mitigate these issues, this specification describes a system that implements a constrained sampling framework to improve both the efficiency and accuracy of the trajectory prediction outputs, e.g., when deployed on-board an autonomous vehicle. In particular, the general constrained sampling framework enables a controlled and guided diffusion process that facilitates simultaneous trajectory prediction for multiple agents in an environment in a permutation-invariant manner (i.e., invariant to the ordering of the agents) while additionally satisfying an arbitrary set of rules and physical constraints.

Because the guidance is provided in the form of one or more differentiable cost functions evaluated with respect to the agent trajectories, the guidance provides the ability to enforce constraints on the probability distribution of agent trajectories over multiple time steps, thereby making it possible to enforce constraints on, e.g., the behaviors or some other motion characteristics of, one or more agents among the multiple agents during the diffusion process.

In addition to being capable of assisting an on-board system of a vehicle to make more informed planning decisions that cause the vehicle to travel along a safe, smooth, and comfortable trajectory, the general constrained sampling framework can also be used in a wide range of off-board technical applications including trajectory in-painting (where masked or otherwise missing parts of a trajectory are filled in to present a complete trajectory), creation of tailored simulation scenarios, and counterfactual reasoning (generating explanations for the outputs computed by machine learning algorithms), to name just a few examples.

FIG. 1 is a block diagram of an example on-board system 100. The on-board system 100 is physically located on-board a vehicle 102. Being on-board the vehicle 102 means that the on-board system 100 includes components that travel along with the vehicle 102, e.g., power supplies, computing hardware, and sensors.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver. In another example, in response to determining that another agent might interact with the vehicle 102, the vehicle 102 can alert the driver or autonomously apply the brakes of the vehicle 102 or otherwise autonomously change the trajectory of the vehicle 102 to prevent an unwanted interaction between the vehicle 102 and an agent.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be another kind of autonomous vehicle that travels along a roadway, e.g., a truck or a motorcycle. Moreover, the on-board system 100 can include components additional to those depicted in FIG. 1 (e.g., a collision detection system or a navigation system).

The on-board system 100 includes a sensor subsystem 104 which enables the on-board system 100 to "see" the environment in the vicinity of the vehicle 102. More specifically, the sensor subsystem 104 includes one or more sensors, some of which are configured to receive reflections of electromagnetic radiation from the environment in the vicinity of the vehicle 102. For example, the sensor subsystem 104 can include one or more laser sensors (e.g., LIDAR laser sensors) that are configured to detect reflections of laser light. As another example, the sensor subsystem 104 can include one or more radar sensors that are configured to detect reflections of radio waves. As another example, the sensor subsystem 104 can include one or more camera sensors that are configured to detect reflections of visible light.

The sensor subsystem 104 continually (i.e., at each of multiple time points) captures raw sensor data, which can indicate the directions, intensities, and distances travelled by reflected radiation. For example, a sensor in the sensor subsystem 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 100 can process the raw sensor data, e.g., using neural networks or other machine learning models, to generate scene context data 106. The scene context data 106 characterizes a scene in an environment, e.g., an area of the environment that includes the area within a threshold distance of the autonomous vehicle or the area that is within range of at least one sensor of the vehicle.

Generally, the scene context data 106 includes multiple modalities of features that describe the scene in the environment. A modality, as used in this specification, refers to a feature that provides a particular type of information about the environment. Thus, different modalities provide different types of information about the environment.

For example, the scene context data 106 can include features from two or more of the following modalities: (i) a target agent history context data modality that provides information about the current and previous states of a target agent in the scene, (ii) a context agent history context data modality that provides information about the current and previous states of each of the one or more context agents in the scene, (iii) a traffic light context data modality that provides information about at least the current states of one or more traffic lights in the scene, (iv) a road graph context data modality that provides static information about the roadway features in the scene, and (v) an agent interaction context data modality that provides information about interactions between agents in the scene. The agents may be, for example, pedestrians, bicyclists, or other vehicles.

At any given time point, the on-board system 100 can process the scene context data 106 using a trajectory prediction subsystem 114 to generate trajectory prediction outputs 108 that predict the trajectories of agents (e.g., pedestrians, bicyclists, other vehicles, and the like) in the environment in the vicinity of the vehicle 102.

In particular, the on-board system 100 can generate a respective trajectory prediction output 108 for each of multiple target agents in the scene at the given time point. The trajectory prediction output 108 for a target agent predicts the future trajectory of the target agent after the current time point.

As used in this specification, a future trajectory for an agent is a sequence that includes a respective agent state for the agent for each of a plurality of future time points, i.e., time points that are after the current time point. Each agent state identifies at least a waypoint location for the corresponding time point, i.e., identifies a location of the agent at the corresponding time point.

In some implementations, each agent state also includes other information about the state of the agent at the corresponding time point, e.g., the predicted heading of the agent at the corresponding time point. The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

Advantageously, when there are multiple agents, the trajectory prediction subsystem 114 can generate a trajectory prediction output 108 for each of the multiple agents in parallel with the trajectory prediction outputs 108 for others of the multiple agents, so as to allow the on-board system 100 to predict the trajectories of an arbitrarily large number of agents that might be present in the scene given a fixed time budget.

As will be described further below, to generate a trajectory prediction output 108, the trajectory prediction subsystem 114 uses a diffusion model neural network to generate the trajectory prediction output 108 across multiple steps by performing a reverse diffusion process (where each step will be referred to as a "reverse diffusion step," or more simply, a "step").

The on-board system 100 can provide the trajectory prediction outputs 108 generated by the trajectory prediction subsystem 114 to a planning subsystem 116, a user interface subsystem 118, or both.

When the planning subsystem 116 receives the trajectory prediction outputs 108, the planning subsystem 116 can use the trajectory prediction outputs 108 to make fully autonomous or partly autonomous driving decisions. For example, the planning subsystem 116 can generate a fully autonomous plan to navigate the vehicle 102 to avoid a collision with another agent by changing the future trajectory of the vehicle 102 to avoid the predicted future trajectory of the agent.

In a particular example, the on-board system 100 may provide the planning subsystem 116 with trajectory prediction outputs 108 indicating that another vehicle which is attempting to merge onto a roadway being travelled by the vehicle 102 is unlikely to yield to the vehicle 102. In this example, the planning subsystem 116 can generate fully autonomous control outputs to apply the brakes of the vehicle 102 to avoid a collision with the merging vehicle. The fully autonomous or partly autonomous driving decisions generated by the planning subsystem 116 can be implemented by a control system of the vehicle 102. For example, in response to receiving a fully autonomous driving decision generated by the planning subsystem 116 which indicates that the brakes of the vehicle should be applied, the control system may transmit an electronic signal to a braking control unit of the vehicle. In response to receiving the electronic signal, the braking control unit can mechanically apply the brakes of the vehicle.

When the user interface subsystem 118 receives the trajectory prediction outputs 108, the user interface subsystem 118 can use the trajectory prediction outputs 108 to present information to the driver of the vehicle 102 to assist the driver in operating the vehicle 102 safely. The user interface subsystem 118 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102).

In a particular example, the on-board system 100 may provide the user interface system 118 with a trajectory prediction output 108 indicating that another vehicle which is attempting to merge onto a roadway being travelled by the vehicle 102 is unlikely to yield to the vehicle 102. In this example, the user interface subsystem 118 can present an alert message to the driver of the vehicle 102 with instructions to adjust the trajectory of the vehicle 102 to avoid a collision with the merging vehicle.

Figure 2:
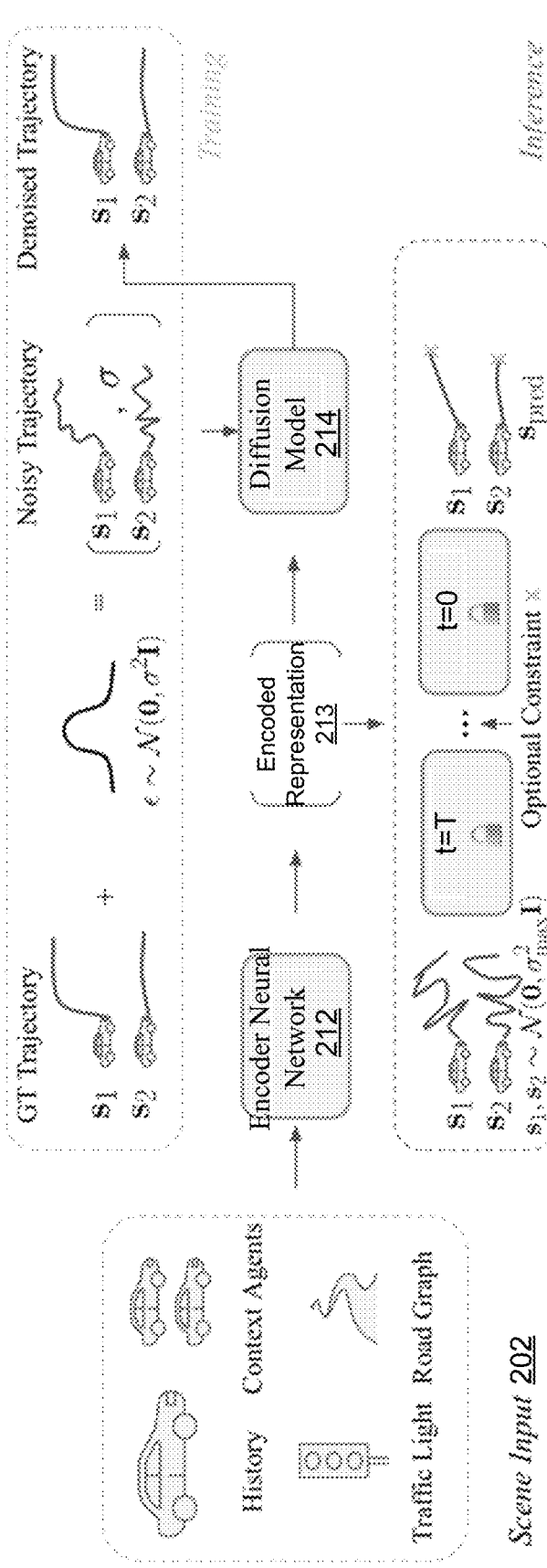
FIG. 2 is an example illustration of training a diffusion model and using the trained diffusion model to generate trajectory prediction outputs.

FIG. 2 is an example illustration 200 of training a diffusion model neural network 214 (or "diffusion model 214" for short) and using the trained diffusion model 214 to compute an inference, i.e., to generate trajectory prediction outputs on-board the vehicle 102 (or another vehicle) or off-board the vehicle 102 (e.g., in simulation). In the example of FIG. 2, the diffusion model 214 is used in tandem with an encoder neural network 212.

During inference, the encoder neural network 212 receives, as input, scene context data 202 that characterizes a scene in an environment at a current time point, and processes the input to generate, as output, an encoded representation 213 of the scene in the environment at the current time point. The encoded representation is structured data which in turn includes a fixed number data elements that reside in a predetermined (e.g., latent) space. For example, the encoded representation can be a multi-dimensional array of numeric values, where the dimensionality of the array is lower than the dimensionality of the scene context data.

The scene in the environment can include one or more target agents and one or more context agents. For example, the agents can include pedestrians, bicyclists, other vehicles, and the so on.

Thus, in some implementations, the encoded representation 213 (which may be referred to as an agent-centric encoded representation) includes one or more encoded sub-representations for each of the target agents, where the encoded sub-representation for a first target agent is different from the encoded sub-representation for a second target agent. In other implementations, however, the encoded representation 213 (which may be referred to as an agent-agnostic encoded representation) is or includes a common encoded representation for all of the target agents.

As described above, the scene context data 202 can include multiple modalities of data. In the example of FIG. 2, the multiple modalities of data include (i) target agent history context data, (ii) context agent history context data, (iii) traffic light context data, and (iv) road graph context data.

The target agent history context data includes data characterizing current and previous states of each of the one or more target agents in the scene.

The context agent history context data includes data characterizing current and previous states of each of the one or more context agents in the scene.

The traffic light context data includes data characterizing at least respective current states of one or more traffic signals in the scene. The current state of a traffic light at a given time point represents the indication being provided by the traffic signal at the given time point, e.g., whether the traffic light is green, yellow, red, flashing, and so on.

The road graph context data includes data characterizing roadway features in the scene, e.g., driving lanes, crosswalks, and so on.

In other examples, the scene context data 202 can include fewer or more modalities of data. For example, the scene context data 202 can additionally or alternatively include agent interaction context data characterizing interactions between the target and context agents in the scene.

The encoder neural network 212 can have any appropriate architecture that allows the encoder neural network to map the scene context data 202 into the encoded representation 213. In the example of FIG. 2 and other example where the scene context data 202 includes two or more modalities of data, the encoder neural network 212 can be configured as an attention neural network that includes one or more attention layers, e.g., cross-modal attention layers.

In a particular example, the encoder neural network 212 can have any of the architectures of the scene encoder neural network described in arXiv: 2207.05844. In other examples, the encoder neural network 212 can have different architectures, e.g., architecture similar to those described in arXiv: 1910.03650 and arXiv:2103.14023.

The diffusion model 214 then generates the respective trajectory prediction output for each of the one or more target agents conditioned on the encoded representation 213 and across multiple reverse diffusion steps by performing a reverse diffusion process.

For example, a reverse diffusion process can be defined as:

$$x_0 = \tag{1}$$
$$x(T) + \int_T^0 -\dot{\sigma}(t)\sigma(t)\nabla_x \log p_\theta(x(t); \sigma(t))dt \quad \text{where} \quad x(T) \sim \mathcal{N}(0, \sigma_{max}^2 I),$$

where noise level $\sigma(t)$ is defined by a predetermined function of reverse diffusion step t, where t runs from t=T to t=0.

$\nabla_x \log p_\theta(x(t))$ is a time-dependent score function. When the encoded representation 213 is used as the conditioning input c, the time-dependent score function is also dependent on c and becomes $\nabla_x \log p_\theta(x(t); c, \sigma(t))$.

This (conditional) time-dependent score function can be approximated by the diffusion output $D_\theta$ of the diffusion neural network 214 as:

$$\nabla_x \log p_\theta(x; c, \sigma) = (D_\theta(x; c, \sigma) - x)/\sigma^2, \tag{2}$$

where $\theta$ represents the parameters of the diffusion model 214, and x represents an intermediate representation, where x(t) is the current intermediate representation as of the reverse diffusion step t.

That is, the time-dependent score function includes at least a term that is dependent on a difference between (i) the diffusion output $D_\theta$ and (ii) the current intermediate representation of the respective trajectory prediction output x.

During inference, an initial intermediate representation of the respective trajectory prediction output x(T) for each target agent can be sampled from a predetermined noise distribution with a predetermined standard deviation, e.g., a unit Gaussian distribution scaled to the highest standard deviation $\sigma(T)=\sigma_{max}$. The initial (or current) intermediate representation has the same dimensionality as the trajectory prediction output, which is typically a tensor, but has noisy values.

For each target agent, the initial intermediate representation will then be iteratively (i.e., at each of multiple reverse diffusion steps) updated to generate an updated intermediate representation, where the updated intermediate representation generated in the last reverse diffusion step is used as the final representation of the trajectory prediction output for the target agent.

At each reverse diffusion step t, the updated intermediate representation as of the step can be determined based on evaluating Equation (1) with respect to t, between t=T and t=t. In some implementations, Equation (1) can be evaluated numerically, e.g., by applying a stochastic differential equation (SDE) solver that implements a Heun's method, an Euler-Maruyama method, a Runge-Kutta method, or the like based on discretizing the continuous function where the integration function is approximated by discrete increments of reverse diffusion steps t.

In some implementations, a constraint can be added when performing the reverse diffusion process, i.e., to the generation of the updated intermediate representation for each of one or more of the multiple reverse diffusion steps. When added, the constraint may be viewed as a guidance that "guides" the generation of the predicted trajectories to enforce rules or physical priors that affect one or more aspects of these trajectories. For example, a constraint can be added so that the predicted trajectories of a target agent avoid collision with other target or context agents. As another example, a constraint can be added so as to achieve trajectory in-painting (where masked or otherwise missing parts of a trajectory are filled in to present a complete trajectory).

In the example of FIG. 2, an optional constraint in the form of one or more (differentiable) loss functions is added to the score function as defined by Equation (2) to provide guidance during the reverse diffusion process, and to provide controllability over how the predicted trajectories should be generated, e.g., to a planning subsystem or another computer system that is either on-board or off-board the vehicle. A few examples of loss functions that define various types of possible constraints will be described further below with reference to FIG. 4.

To that end, the diffusion model 214 can have any appropriate neural network architecture that allows the diffusion model to map a diffusion input that includes, for each target agent, (i) the current intermediate representation of the respective trajectory prediction output for the reverse diffusion step, (ii) the conditioning input (the encoded representation 213 of the scene in the environment) and (iii) noise data indicating a noise level of the reverse diffusion step, to a diffusion output $D_\theta$ that is subsequently used to approximate the score function, from which the updated intermediate representation of the respective trajectory prediction output for the reverse diffusion time step can be determined.

For example, the diffusion model 214 can include any appropriate types of neural network layers (e.g., fully connected layers, attention layers, convolutional layers, and so forth) in any appropriate number (e.g., 5 layers, or 10 layers, or 100 layers) and connected in any appropriate configuration (e.g., as a directed graph of layers).

Figure 3:
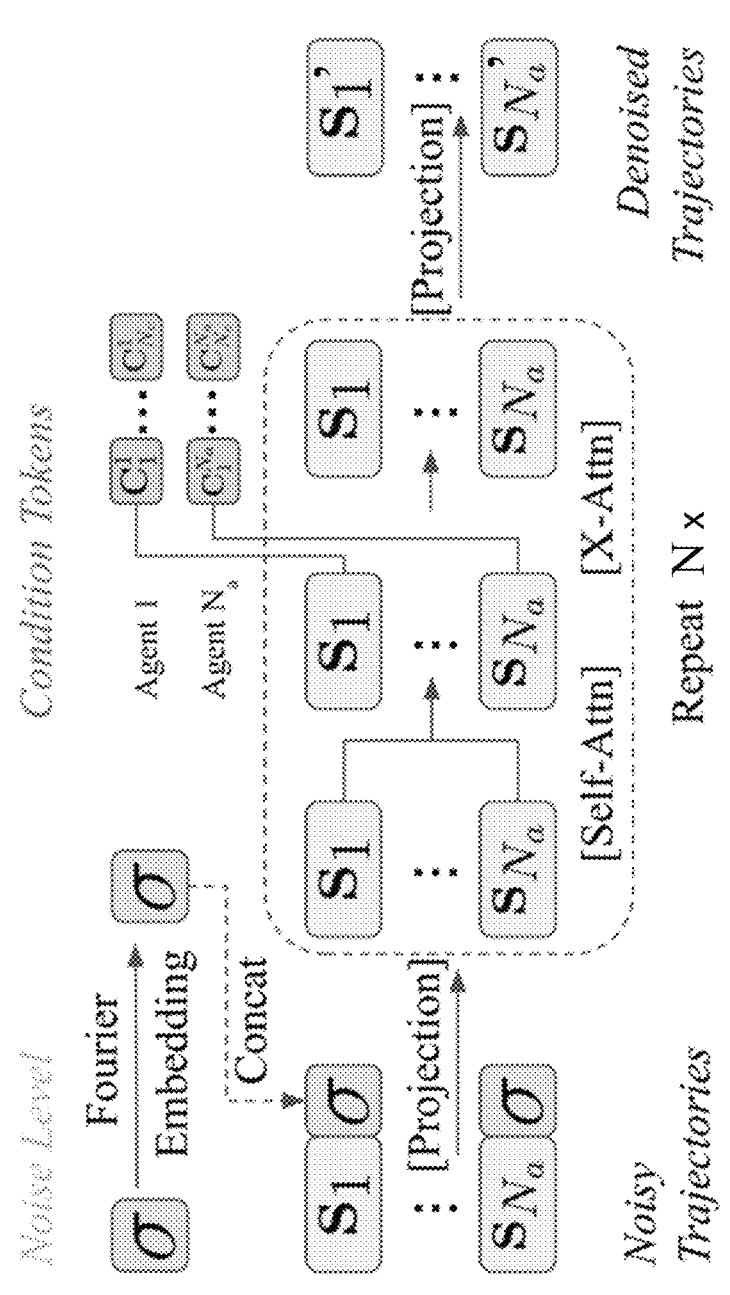
FIG. 3 shows an example illustration of operations performed by a diffusion model.

FIG. 3 shows an example illustration of operations performed by a diffusion model 300 at a given reverse diffusion step t. The diffusion model 300 in the example of FIG. 3 has a cross-attention-based architecture. The operations illustrated in FIG. 3 can also be performed by diffusion model neural networks that have other architectures which may or may not be attention-based.

As shown in FIG. 3, the diffusion model 300 includes N attention blocks (where N can be any integer number greater than or equal to one). Each attention block includes a stack of one or more self-attention [Self-Attn] layers followed by a stack of one or more cross-attention [X-Attn] layers.

At the given reverse diffusion step t, the diffusion model 300 receives, for each of the multiple target agents, the current intermediate representation of the trajectory prediction output for the target agent for the reverse diffusion step. The current intermediate representation has the same dimensionality as the trajectory prediction output but has noisy values.

When the given reverse diffusion step t is the very first reverse diffusion time step, the current intermediate representation s is the initial intermediate representation that can be sampled from a predetermined noise distribution with a predetermined standard deviation. When the given reverse diffusion step t is a subsequent reverse diffusion step, the current intermediate representation s is the updated intermediate representation that has been generated in the immediately preceding reverse diffusion step t+1.

For example, the diffusion model 300 receives the current intermediate representation $S_1$ for a first target agent, the current intermediate representation $S_2$ for a second target agent, and so on, up to the current intermediate representation $S_{N_\alpha}$ for an Nth target agent.

The diffusion model 300 also receives noise data indicating a noise level $\sigma(t)$ of the reverse diffusion step t. In some implementations, the noise data includes a random Fourier encoded representation of the noise level $\sigma(t)$, where the noise level $\sigma(t)$ is embedded using a fixed number of random Fourier features.

The noise level $\sigma$ can be determined based on computing a noise level function for the reverse diffusion step t. For example, the noise level function can be a linear noise level function $\sigma(t)=t$. The noise level function can also be another monotonic, deterministic function.

The diffusion model 300 combines, e.g., by computing a concatenation of, the noise data and the current intermediate representation of the respective trajectory prediction output for the reverse diffusion step t to generate a combination, e.g., a concatenation, for each target agent. Optionally, in some implementations, the diffusion model 300 additionally projects the combination for each target agent by applying a projection function [Projection] to have the same dimensionality as the current intermediate representation.

Next, the diffusion model 300 processes the (projected) combinations using the stack of one or more self-attention layers and the stack of one or more cross-attention layers to update the combinations.

The stack of self-attention layers generates, for each target agent, a self-attended intermediate representation at least in part by applying a self-attention mechanism over the respective current intermediate representations for the multiple target agents.

The stack of cross-attention layers generates, for each target agent, a cross-attended intermediate representation at least in part by applying a cross-attention mechanism over (i) the self-attended intermediate representations for the multiple target agents (which have been generated by the last self-attention layer in the stack) and (ii) at least a portion of the encoded representation.

To generate the cross-attended intermediate representation for each target agent, in addition to being applied to the self-attended intermediate representations, when the encoded representation is an agent-centric encoded representation, the cross-attention mechanism is applied only to the encoded sub-representation for the target agent that is included as part of the encoded representation.

For example, to generate the cross-attended intermediate representation for the first target agent, the cross-attention mechanism is applied to a first encoded sub-representation that includes a set of conditioning tokens $$c_1^1 \ldots c_{N_c}^1$$

generated by the encoder neural network for the first target agent, and not to the Nth encoded sub-representation that includes a set of conditioning tokens $$c_1^{N_a} \ldots c_{N_c}^{N_a}$$

generated by the encoder neural network for the Nth target agent.

Alternatively, to generate the cross-attended intermediate representation for each target agent, in addition to being applied to the self-attended intermediate representations, when the encoded representation is an agent-agnostic encoded representation, the cross-attention mechanism is applied to the common encoded representation for all of the multiple target agents.

The diffusion model 300 projects, for each target agent, and by applying a projection function [Projection], the cross-attended intermediate representation to have the same dimensionality as the updated intermediate representation, and then uses the projected cross-attended intermediate representation as a part of the diffusion output $D_\theta$ for the reverse diffusion step t. Thus, the diffusion output $D_\theta$ includes the projected cross-attended intermediate representations for the multiple target agents.

A score function can then be computed using the diffusion output $D_\theta$, and the score function can be used to determine, in accordance with Equations (1)-(2) and by using a stochastic differential equation (SDE) solver, the updated intermediate representation of the respective trajectory prediction output for the reverse diffusion time step for the given reverse diffusion step t.

For example, the diffusion model 300 generates the updated intermediate representation $S_1'$ for the first target agent, the updated intermediate representation $S_2'$ for the second target agent, and so on, up to the updated intermediate representation $S_{N_\alpha}'$ for the Nth target agent.

Advantageously, the reverse diffusion process for trajectory prediction supports parallel processing when the diffusion model is implemented on one or more different types of processing units, e.g., central processing units ("CPUs"), graphics processing units ("GPUs"), and tensor processing units ("TPUs"), as well as other forms of special-purpose logic circuitry, such as field-programmable gate arrays ("FPGAs"), and application-specific integrated circuits ("ASICs"). Because for each of the multiple target agents, the operations described above can be performed in parallel with others of the multiple target agents, the diffusion model can generate the respective trajectory prediction output for each of a very large number of target agents within a fixed time budget.

Prior to using the diffusion model 214 to make predictions, a training system can determine trained parameter values of the diffusion model 214 and, optionally, the encoder neural network 212 by training the diffusion model 214 on training data, e.g., based on optimizing a denoising score matching objective. While the on-board system is located on-board a vehicle, the training system is typically hosted within a data center, which can be a distributed computing system having hundreds or thousands of computers in one or more locations.

For example, a (conditional) denoising score matching objective can be defined as:

$$\mathbb{E}_{x,c \sim X_c} \mathbb{E}_{\sigma \sim q(\sigma)} \mathbb{E}_{\epsilon \sim \mathcal{N}(0,\sigma^2 I)} \|D_\theta(x + \epsilon; c, \sigma) - x\|_2^2, \quad (3)$$

where $X_c = \{(x_1, c_1), \ldots, (x_{N_\alpha}, c_N)\}$ is the training data that includes a set of ground truth agent trajectories, where x is a ground truth agent trajectory (for a respective one of a total of $N_\alpha$ agents) and c is a conditioning input associated with the agent trajectory.

FIG. 2 thus illustrates that, during training, for any given agent that has a known, ground truth (GT) trajectory, noise $\epsilon$ is sampled from a normal distribution and added to the ground truth trajectory for the given agent to generate an initial intermediate representation of a trajectory prediction output (a "noisy" trajectory).

The diffusion model 214 is configured to update, conditioned on the condition input c, the initial intermediate representation across multiple reverse diffusion steps to generate a final trajectory prediction output that specifies a predicted trajectory (a "denoised" trajectory) for the given agent.

As defined in Equation (3), the diffusion model 214 and, optionally, the encoder neural network 212 can then be trained end-to-end based on minimizing a L2 loss which measures, for each of the total of $N_\alpha$ agents, a difference between the predicted trajectory and the ground truth trajectory, and by virtue of gradient backpropagation.

Figure 4:
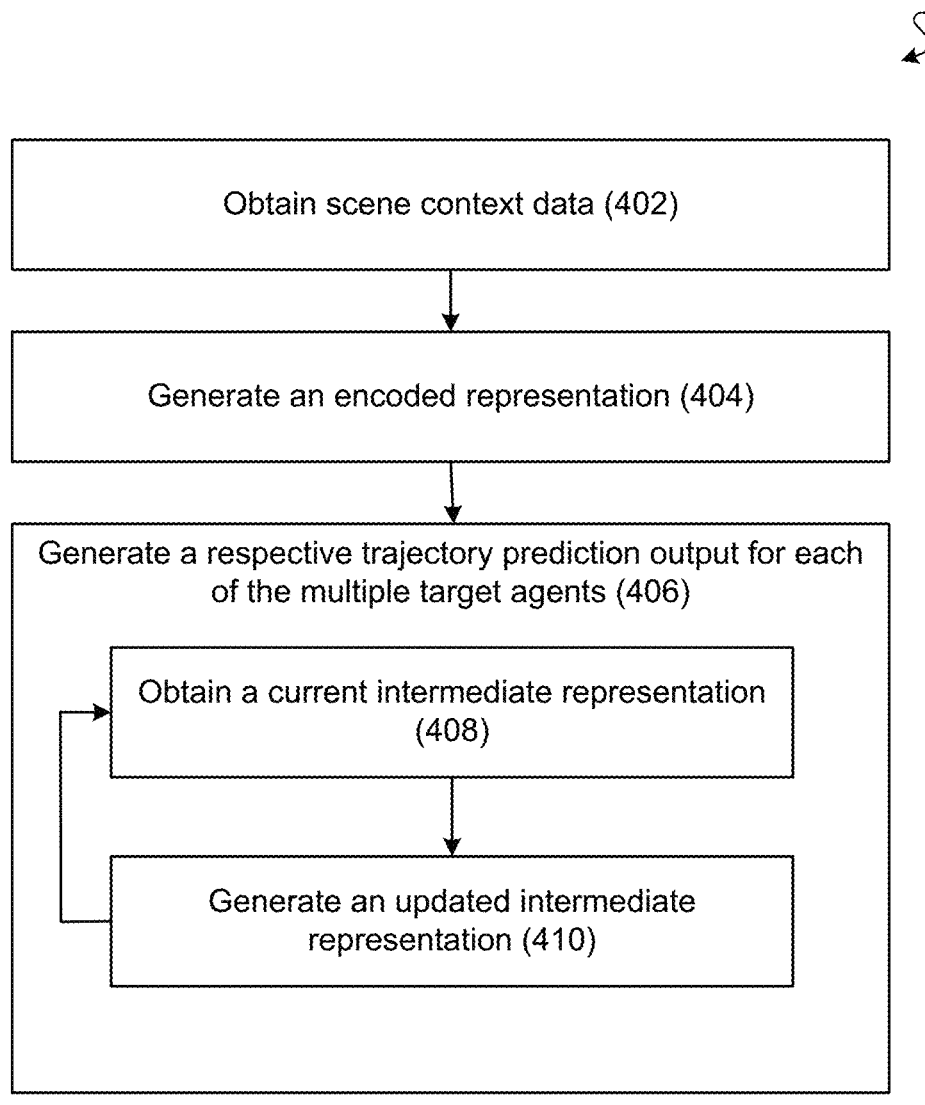
FIG. 4 is a flow diagram of an example process for generating trajectory prediction outputs for multiple target agents.

FIG. 4 is a flow diagram of an example process 400 for generating trajectory prediction outputs for multiple target agents. For convenience, the process 400 will be described as being performed by a system of one or more computers located in one or more locations. For example, a system, e.g., the on-board system 100 depicted in FIG. 1, appropriately programmed in accordance with this specification, can perform the process 400.

The system obtains scene context data characterizing a scene in an environment at a current time point (step 402). The scene can include multiple agents, such as one or more target agents and one or more context agents. Each target agent is an agent in a vicinity of an autonomous vehicle in an environment (for which the future trajectory should be predicted). For example, each target agent can be a vehicle, a pedestrian, a cyclist, etc.

The scene context data includes respective context data for each of multiple different modalities of context data (e.g., target agent history context data, context agent history context data, traffic light context data, and road graph context data).

In some implementations, the scene context data includes data generated from data captured by one or more sensors of an autonomous vehicle in a real-world environment, and the target agent is an agent in the vicinity of the autonomous vehicle.

In other implementations, the scene context data includes data generated from data that simulates data that would be captured by one or more sensors of an autonomous vehicle in the real-world environment, and the target agent is a simulated agent in a vicinity of the simulated autonomous vehicle in the computer simulation.

The system generates, from the scene context data, an encoded representation of the scene in the environment (step 404). The encoded representation can be generated by processing the scene context data using an encoder neural network, e.g., the encoder neural network 212 of FIG. 2, or another encoder neural network that is capable of processing data from multiple different modalities.

The system performs a reverse diffusion process to generate, by using a diffusion model and based on the encoded representation, a respective trajectory prediction output for each of the multiple target agents (step 406).

The reverse diffusion process involves generating an initial intermediate representation of each respective trajectory prediction output, and then repeatedly performing following one iteration of steps 408 and 410 at each of multiple reverse diffusion steps to update the initial intermediate representations. After having performed the iteration of steps 408 and 410 in last reverse diffusion step in the reverse diffusion process, the system outputs the updated intermediate representations as the respective trajectory prediction outputs of the multiple target agents.

Each trajectory prediction output predicts a future trajectory of a corresponding target agent that span multiple future time points after a current time point. To that end, the trajectory prediction output can include data in any of a variety of formats that define one or more future trajectories of the corresponding target agent.

For example, the trajectory prediction output can define the future trajectories of the target agent deterministically, e.g., where each trajectory prediction output includes, for each of the multiple future time points, data specifying a predicted agent state corresponding to the future time point that each identifies a waypoint location (a possible spatial location in the environment) that could be traversed by the target agent at the future time point.

As another example, the trajectory prediction output can define the future trajectories of the target agent stochastically, e.g., where the trajectory prediction output includes data defining a probability distribution over a set of possible future trajectories of the target agent after the current time point. In this example, the trajectory prediction output can for example include data defining the parameters of a respective probability distribution for (each predicted agent state along) each possible future trajectory.

In a particular example, the respective trajectory prediction outputs for the multiple target agents can be represented as a tensor $$S_i \in \mathbb{R}^{N_a \times N_t \times N_f},$$

where $N_\alpha$ is the total number of target agents, $N_t$ is the number of future time steps spanned by the predicted trajectory for each target agent, and $N_f$ is the number of features of the predicted trajectory at each future time step.

The features can for example include the location of the agent (e.g., defined as longitudinal and lateral positions in a predetermined coordinate system), the heading of the agent, and so on.

For each target agent, the initial intermediate representation (and, correspondingly, the updated intermediate representation) of the trajectory prediction output is the same dimensionality as the trajectory prediction output but has noisy values. For example, the system can initialize the intermediate representation of the trajectory prediction output by sampling each value in the trajectory prediction output from a corresponding noise distribution, e.g., a Gaussian distribution, or a different noise distribution. That is, the trajectory prediction output includes multiple values and the initial intermediate representation includes the same number of values, with each value being sampled from a corresponding noise distribution.

In some implementations, the system performs the reverse diffusion process in the same space as the trajectory prediction outputs, and the initial intermediate representations of the respective trajectory prediction outputs are iteratively updated in the same space.

In other implementations, the system performs the reverse diffusion process in a latent space that is different than the space that has the trajectory prediction outputs. For example, the latent space can be a principal component analysis (PCA) space, which approximates the original, higher-dimensional space with a lower-dimensional space that includes a fixed set of PCA components. When used, PCA generally allows for faster inference, better accuracy and diffusion model performance.

In these other implementations, the system transforms, e.g., using PCA analysis techniques, the initial intermediate representations into the latent space, e.g., the PCA space, and then performs the reverse diffusion process to update the transformed initial intermediate representations in the latent space to generate the transformed, final updated intermediate representations. After having performed the reverse diffusion process in the latent space, the system then transforms the final updated intermediate representations back to the original space to obtain the trajectory prediction outputs.

The steps to be performed at each of the multiple reverse diffusion steps are described next.

The system obtains, for each of the multiple target agents, a current intermediate representation of the respective trajectory prediction output for the reverse diffusion step (step 408). When the given reverse diffusion step is the very first reverse diffusion time step, the current intermediate representation is the initial intermediate representation. When the given reverse diffusion step is a subsequent reverse diffusion step, the current intermediate representation is the updated intermediate representation that has been generated in the immediately preceding reverse diffusion step.

The system updates, for each of the multiple target agents, the current intermediate representation of the respective trajectory prediction output to generate an updated intermediate representation of the respective trajectory prediction output for the reverse diffusion step (step 410).

To do this, the system provides a diffusion input that includes, for each target agent, (i) the current intermediate representation of the respective trajectory prediction output for the reverse diffusion step, (ii) the encoded representation of the scene in the environment and (iii) noise data indicating a noise level of the reverse diffusion step to a diffusion model, and uses the diffusion model to process the diffusion input to generate a diffusion output.

The system then computes a score function using the diffusion output, and then determines the updated intermediate representation of the respective trajectory prediction output for the reverse diffusion step by applying a stochastic differential equation (SDE) solver to the score function.

The score function includes at least a first term dependent on a difference between (i) the diffusion output and (ii) the current intermediate representation of the respective trajectory prediction output.

In some implementations, as mentioned above, the score function also includes a second term that represents one or more constraints, e.g., rules or physical priors, added to the reverse diffusion process to guide how the future trajectories of the target agents can be generated.

In implementations where constraints are added to the reverse diffusion process, the score function can be defined as:

$$\nabla_S \log p(S; C, \sigma) + \nabla_S \log q(S; C, \sigma), \qquad (4)$$

where the first term $\nabla_S \log p(S; C,\sigma)$ corresponds to the conditional time-dependent score function defined in Equation (2), and the second term $\nabla_S \log q(S; C,\sigma)$ accounts for gradient guidance based on the constraints. Here $$S_i \in \mathbb{R}^{N_a \times N_t \times N_f}$$

is a tensor representing the collection of the intermediate representations of the respective trajectory prediction outputs for the multiple target agents; $N_\alpha$ is the total number of target agents, $N_t$ is the number of future time steps spanned by the predicted trajectory for each target agent, and $N_f$ is the number of features of the predicted trajectory at each future time step.

The one or more constraints can be defined by one or more predetermined differentiable cost functions, and thus the second term, which represents the constraints, can be approximated as:

$$\nabla_S \log q(S; C, \sigma) \approx \lambda \frac{\partial}{\partial S} \mathcal{L}(D(S; C, \sigma)),$$

where $$\mathcal{L}:\mathbb{R}^{N_a \times N_t \times N_f} \mapsto \mathbb{R}$$

is a predetermined differentiable cost function.

Each such cost function is evaluated with respect to the future trajectories of the target agents that have been predicted in the current intermediate representations of the respective trajectory prediction outputs for the reverse diffusion step. A few example cost functions are described next.

For example, the predetermined differentiable cost functions can include an attractor cost function that is defined as:

$$\mathcal{L}_{attract}(D(S; C, \sigma)) = \frac{\sum |(D(S; C, \sigma) - S_{target}) \odot M_{target}|}{\sum |M_{target}| + eps},$$

where $S_{target}$ $$S_{target} \in \mathbb{R}^{N_a \times N_t \times N_f}$$

is tensor representing the target locations in the environment that the multiple target agents should traverse, and $M_{target}$ is a binary mask tensor indicating which locations in $S_{target}$ to enforce. $\odot$ denotes the elementwise product and eps represents an infinitesimal value to prevent underflow. When included, the attractor cost function encourages each of one or more of the predicted future trajectories to arrive at one or more respective locations at one or more respective future time steps.

As another example, the predetermined differentiable cost functions can include a repeller cost function that is defined as:

$$A = \max\left(\left(1 - \frac{1}{r}\Delta(D(S; C, \sigma))\right) \odot (1 - I), 0\right)$$

$$\mathcal{L}_{repell}(D(S)) = \frac{\sum A}{\sum (A > 0) + eps},$$

where A is the per time step repeller cost, $$\Delta(D(S; C, \sigma)) \in \mathbb{R}^{N_a \times N_a \times N_f}$$

represents the pairwise L2 distance between all pairs of target agents at the multiple future time points, $$I \in \mathbb{R}^{N_a \times N_a \times N_t}$$

is an identity tensor that is broadcasted to each of the multiple future time steps, and r represents the repeller radius. When included, the repeller cost function discourages the predicted future trajectories from being within a given distance to each other.

As another example, the predetermined differentiable cost functions can include a constrainer cost function.

$$\sigma \nabla_x \log p(x; \sigma) = (D(x, \sigma) - x)/\sigma = \epsilon, \epsilon \sim \mathcal{N}(0, I).$$

When included, the constrainer cost function discourages a particular predicted future trajectory from deviating away from a given future trajectory.

Accordingly, for example, for a particular target agent, a first future trajectory predicted by the updated intermediate representation of the respective trajectory prediction output for a first reverse diffusion step may be identical to a second future trajectory predicted by the updated intermediate representation of the respective trajectory prediction output for a second reverse diffusion step.

As yet another example, the predetermined differentiable cost functions can include two or more of the attractor cost function, the repeller cost function, or the constrainer cost function mentioned above.

Moreover, to further increase the stability of the reverse diffusion process, in some of these implementations, the system applies an elementwise clipping function to clip a constraint score computed using the score function defined in Equation (4) to have an adjusted maximum or minimum score value:

$$\nabla_S \log q(S; C, \sigma) := \text{clip}(\sigma \nabla_S \log q(S; C, \sigma), \pm 1)/\sigma.$$

After the last reverse diffusion step, the system can output the updated intermediate representations generated in the last reverse diffusion step as the respective trajectory prediction output for each of the multiple target agents.

In some implementations, the trajectory prediction outputs are generated on-board the autonomous vehicle. In these implementations, the system can then provide the trajectory prediction outputs for the target agents, data derived from the trajectory prediction outputs, or both to an on-board system of the autonomous vehicle for use in controlling the autonomous vehicle.

In some other examples, the system can provide trajectory prediction outputs, data derived from the trajectory prediction outputs, or both for use in controlling the simulated autonomous vehicle in the computer simulation.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
obtaining scene context data characterizing a scene at a current time point in an environment that includes multiple target agents;
generating, from the scene context data, an encoded representation of the scene in the environment;
generating, by using a diffusion model and based on the encoded representation, a respective trajectory prediction output that predicts a respective future trajectory for each of the multiple target agents after the current time point by repeatedly updating an intermediate representation of the respective trajectory prediction output across multiple steps in a generation process; and
controlling a vehicle based on the respective trajectory prediction output that predicts the respective future trajectory for each of the multiple target agents.

2. The method of claim 1, wherein generating the respective trajectory prediction output comprises, at each of the multiple steps in the generation process:
obtaining, for each of the multiple target agents, a current intermediate representation of the respective trajectory prediction output for the step; and
updating, for each of the multiple target agents, by the diffusion model based on the encoded representation, the current intermediate representation to generate an updated intermediate representation of the respective trajectory prediction output for the step.

3. The method of claim 2, wherein obtaining the current intermediate representation of the respective trajectory prediction output for the step comprises:
determining a noise level based on computing a noise level function for the step; and
determining a combination of the noise level and an updated intermediate representation of the respective trajectory prediction output for an immediately preceding step.

4. The method of claim 3, wherein determining the combination of the noise level and the updated intermediate representation comprises:
determining a concatenation of the noise level and the updated intermediate representation of the respective trajectory prediction output for an immediately preceding step; and
projecting the concatenation to have a projected dimensionality of the current intermediate representation.

5. The method of claim 2, wherein obtaining the intermediate representation of the respective trajectory prediction output for a beginning step comprises:
sampling from a Gaussian distributed noise with a predetermined standard deviation.

6. The method of claim 2, wherein the diffusion model is an attention-based diffusion model, and wherein updating the current intermediate representation to generate the updated intermediate representation of the respective trajectory prediction output for the step comprises:
generating, for each of the multiple target agents, a self-attended intermediate representation at least in part by applying a self-attention mechanism over the current intermediate representations;
generating, for each of the multiple target agents, a cross-attended intermediate representation at least in part by applying a cross-attention mechanism over the self-attended intermediate representations and the encoded representation; and
generating, for each of the multiple target agents and from the cross-attended intermediate representations, the updated intermediate representation of the respective trajectory prediction output for the step.

7. The method of claim 2, wherein for a particular target agent in the multiple target agents, future trajectories predicted by the updated intermediate representations of the respective trajectory prediction output for two or more different steps in the generation process are the same.

8. The method of claim 2, wherein the generating comprises, for each of the multiple target agents:
using the updated intermediate representation of the respective trajectory prediction output for a last step in the generation process as the respective trajectory prediction output for the target agent that predicts the future trajectory of the target agent after the current time point.

9. The method of claim 1, wherein the trajectory prediction outputs are generated in a compressed space that has a predetermined dimensionality.

10. The method of claim 1, wherein the trajectory prediction output defines a probability distribution over possible future trajectories of each of the multiple target agents after the current time point.

11. The method of claim 1, wherein:
the scene context data comprises data generated from data captured by one or more sensors of the vehicle, and
the target agents comprise agents in a vicinity of the vehicle in the environment.

12. The method of claim 11, further comprising:

providing (i) the trajectory prediction outputs for the target agents, (ii) data derived from the trajectory prediction outputs, or (iii) both to an on-board system of the vehicle for use in controlling the vehicle.

13. The method of claim 12, wherein the trajectory prediction outputs are generated on-board the vehicle.

14. The method of claim 1, wherein:

the vehicle is a simulated vehicle;

the scene context data comprises data generated from data that simulates data that would be captured by one or more sensors of the vehicle in the real-world environment, and the target agents comprise simulated agents in a vicinity of the simulated autonomous vehicle in the computer simulation.

15. The method of claim 14, further comprising:

providing (i) the trajectory prediction outputs, (ii) data derived from the trajectory prediction outputs, or (iii) both for use in controlling the simulated vehicle in the computer simulation.

16. The method of claim 1, wherein the scene context data comprises target agent history context data characterizing current and previous states of the target agents.

17. The method of claim 1, wherein the scene context data comprises context agent history context data characterizing current and previous states of each of the one or more context agents.

18. The method of claim 1, wherein the scene context data comprises road graph context data characterizing road features in the scene.

19. The method of claim 1, wherein the scene context data comprises traffic signal context data characterizing at least respective current states of one or more traffic signals in the scene.

20. A system comprising:

one or more computers; and one or more storage devices storing instructions that, when executed by the one or more computers, cause the one or more computers to perform operations comprising:

obtaining scene context data characterizing a scene at a current time point in an environment that includes multiple target agents;

generating, from the scene context data, an encoded representation of the scene in the environment;

generating, by using a diffusion model and based on the encoded representation, a respective trajectory prediction output that predicts a respective future trajectory for each of the multiple target agents after the current time point by repeatedly updating an intermediate representation of the respective trajectory prediction output across multiple steps in a generation process; and controlling a vehicle based on the respective trajectory prediction output that predicts the respective future trajectory for each of the multiple target agents.

21. One or more non-transitory computer-readable storage media storing instructions that when executed by one or more computers cause the one or more computers to perform operations comprising:

obtaining scene context data characterizing a scene at a current time point in an environment that includes multiple target agents;

generating, from the scene context data, an encoded representation of the scene in the environment;

generating, by using a diffusion model and based on the encoded representation, a respective trajectory prediction output that predicts a respective future trajectory for each of the multiple target agents after the current time point by repeatedly updating an intermediate representation of the respective trajectory prediction output across multiple steps in a generation process; and controlling a vehicle based on the respective trajectory prediction output that predicts the respective future trajectory for each of the multiple target agents.

* * * * *